INVENTOR
ATSUMI FUJISAWA

INVENTOR
ATSUMI FUJISAWA

United States Patent Office 3,574,018
Patented Apr. 6, 1971

3,574,018
CASE FOR SMALL ARTICLES AND METHOD OF MANUFACTURING THE SAME
Atsumi Fujisawa, 26–13 Asakusa 2-chome, Taito-ku, Tokyo, Japan
Filed Sept. 26, 1967, Ser. No. 670,675
Claims priority, application Japan, Sept. 27, 1966, 41/63,383
Int. Cl. A44b 19/34
U.S. Cl. 156—66                                              4 Claims

ABSTRACT OF THE DISCLOSURE

A case for small articles comprises a pair of superposed sheets of flexible, heat sealable, synthetic resin heat sealed to each other along their peripheral edges. One of the sheets has a substantially rectangular opening therein while the other sheet is substantially imperforate. A pad board of relatively thick paper, formed with a score line or lines extending along its longitudinal center line is inserted into the resultant bag, and may have a sheet of synthetic resin along its unscored surface. A separable slide fastener is secured around the periphery of the opening in the one sheet, and an inner lining of flexible synthetic resin is placed over the pad board. The case may be folded about the score lines of the pad board, and the separable slide fastener closed.

In one embodiment of the invention, the two initially superposed sheets have their heat sealed edges inturned by turning the "bag" inside out after cutting two diagonally intersecting slits in the surface of one sheet to form four substantially triangular tabs. In the other embodiment of the invention, the heat sealed edges of the original sheets are covered by an edge tape heat sealed to one of the sheets and turned back on itself to overlap the other sheet, the inner periphery of this edge tape defining the aforementioned opening.

BACKGROUND OF THE INVENTION

In the manufacture of cases for small articles, such as toilet cases, brief cases, and the like, difficulty has hitherto been experienced in preventing creases and folds in the exterior wall during the manufacturing process. Furthermore, when such cases have been provided with a stiffening or pad board therewithin, difficulty has been experienced in maintaining this pad board properly in position, and movement of the pad board has resulted in wear and tear of the exterior wall due to friction.

When such cases have been formed by using a binding agent to secure two sheets to each other, there has been danger of staining the resultant product with the binding agent. Additionally, it has been very difficult to obtain finished articles which are free of stains, are of uniform quality, and can be economically and efficiently manufactured.

SUMMARY OF THE INVENTION

This invention relates to cases for small articles and, more particularly, to a novel and improved method of manufacturing such a case using flexible synthetic resin, and to the improved case produced by the invention method.

In one embodiment of the invention method, a case for small articles is formed by superposing two substantially rectangular sheets of soft, flexible, heat sealable synthetic resin with their eventually outer surfaces in contact, and heat sealing the two sheets together around their periphery. One of the sheets then has two cuts made therein along two intersecting diagonals, to form four substantially triangular tabs, and the "bag" is turned inside out. A pad board, made of thick paper and provided with one or more score lines extending centrally along one surface, is then inserted into the bag so that it engages the inturned edges of the synthetic resin sheets. This pad board may have a sheet of the synthetic resin applied to its unscored surface. The triangular tabs are then cut off, leaving the cut synthetic sheet with a substantially rectangular opening therein, and a separable slide fastener is secured around the edges of this opening, as by heat sealing to the synthetic resin sheet. A liner sheet of relatively thin soft flexible synthetic resin is then superposed on the unscored surface of the pad board, or on the synthetic resin sheet overlying the unscored surface, and heat sealed thereto.

The resultant bag may be folded about its longitudinal center line which is defined by the score lines of the pad board, and the separable fastener may be closed.

In an alternative embodiment of the invention, the scored pad board is placed between the two starting sheets of synthetic resin material, which in this method, have their eventually outer surfaces exposed. The two synthetic resin sheets are heat sealed together along their peripheral portions, and one of the sheets is cut along two intersecting diagonals to form the aforementioned four triangular tabs. A relatively narrow edge tape is then applied to the uncut synthetic sheet and is heat sealed to the latter along its periphery. This edge tape is then folded back on itself around the periphery of the joined sheets and to overlie the cut sheet. A separable slide fastener is then secured around the periphery of the folded over portion of the edge tape, and a liner sheet of synthetic resin material is placed within the case and is heat sealed to the tape of the separable slide fastener.

An object of the present invention is to provide an improved method of manufacturing a case for small articles.

Another object of the invention is to provide an improved case for small articles, having an outer wall formed of soft, flexible, heat sealable synthetic resin.

A further object of the invention is to provide such a case which is free of any creases or folds in its exterior surface.

Still another object of the invention is to provide such a case in which an interior pad board is held firmly in position against movement relative to the exterior wall of the case.

A further object of the invention is to provide such a case including an inserted pad board having one or more score lines extending substantially centrally along one surface thereof.

Yet, another object of the invention is to provide a method of manufacturing a case for small articles, comprising an exterior wall of soft, flexible, heat sealable synthetic resin and characterized in that the method does not have any risk of formation of creases or folds in the exterior surface and does not have any risk of staining of the article by a binding agent or the like.

A further object of the invention is to provide a method of manufacturing a case for small articles which produces neat appearing cases, produces cases of uniform quality, and is economical and efficient.

BRIEF DESCRIPTION OF THE DRAWINGS

For an understanding of the principles of the invention, reference is made to the following description of typical embodiments thereof as illustrated in the accompanying drawings.

In the drawings.

DETAILED DESCRIPTION OF THE PREFERRED EMBODIMENTS

Referring first to FIGS. 1 through 17, in the method of the invention shown therein, a bag body A is formed by superposing a lining sheet $b$ on an exterior sheet $a$. Both sheets are substantially rectangular and are formed of soft, flexible, heat sealable synthetic resin, and the two sheets are superposed inside out and then heat sealed along their peripheries. The heat sealing may be effected by means of high frequency electric current or otherwise, in a manner known to those skilled in the art. The lining sheet $b$ may be formed with a pair of diagonally extending cuts 1, which provide four triangular flaps 2, either before heat sealing to the exterior sheet $a$ or after heat sealing thereto. In either case, the bag body shown at A in FIG. 5 is obtained.

Figure 1:
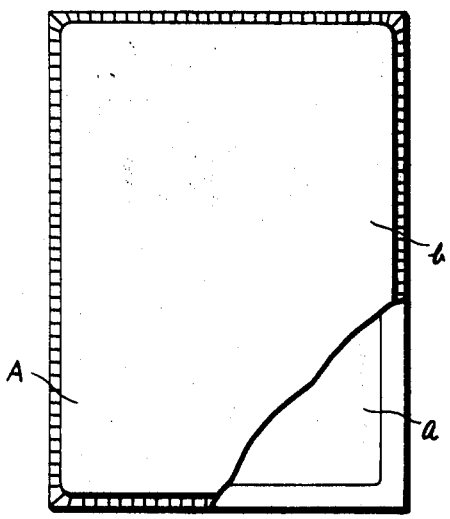
FIG. 1 is a plan view, partially broken away, illustrating the first step in the method of the invention.
Figure 4:
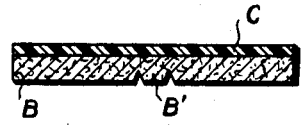
FIG. 4 is a transverse sectional view of FIG. 3.
Figure 5:
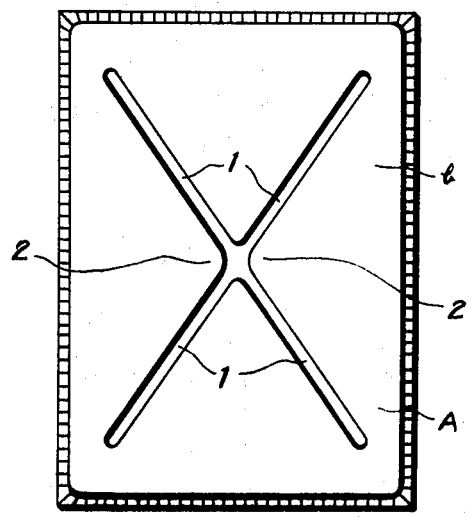
FIG. 5 is a plan view illustrating a further step in the method of the invention.
Figure 2:
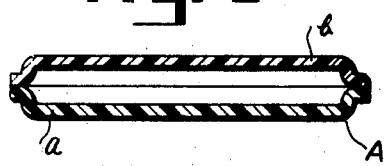
FIG. 2 is a transverse sectional view of FIG. 1.
Figure 3:
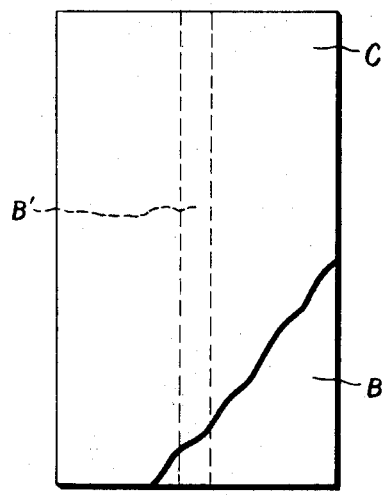
FIG. 3 is a top plan view of a pad board used in the method of the invention.
Figure 6:
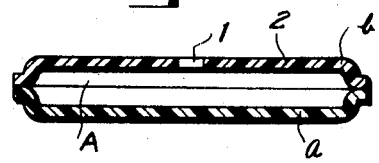
FIGS. 6 through 10 are sectional views illustrating further steps in the method of the invention.
Figure 7:
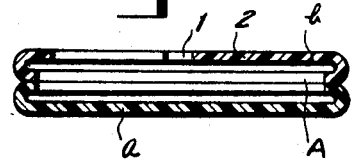

The bag body A shown in FIG. 5 is then turned inside out so that the exterior sheet $a$ has its eventual outer surface exposed and the heat sealed edges of the sheets $a$ and $b$ are turned inwardly. FIG. 6 shows a section of the bag body A illustrated in FIG. 5, and FIG. 7 shows a corresponding section illustrating the bag body after turning the same inside out.

A pad board B is provided, and this board is formed of relatively thick paper and has two parallel score lines or grooves extending centrally of one surface thereof to form a score portion B'. The pad board B is shown in plan in FIG. 3 and in transverse section in FIG. 4, and it will be noted that the unscored surface of pad board B is covered with an auxiliary sheet C of soft, flexible, heat sealable synthetic resin. If desired, the scored surface of pad board B may be covered with foam or sponge material.

Figure 8:
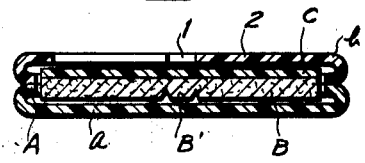
Figure 9:
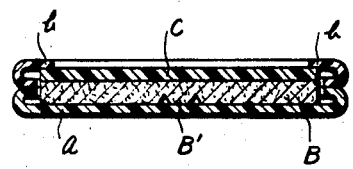

As shown in FIG. 8, the pad board B is inserted into the bag body A, with the triangular flaps 2 being placed under tension and pulled outwardly. The lining sheet $b$ of the bag body is then heat sealed to the auxiliary sheet C of the pad board B, by high frequency current or other known means, while the tabs 2 are placed under tension. The tabs 2 are then severed or cut off, as shown in FIG. 9.

Next, a separable slide fastener 5, including a cloth tape 4, has the cloth tape 4 superposed along the periphery of lining sheet $b$ and an inner sheet $d$ of relatively thin soft, flexible, heat sealable synthetic resin has its periphery superposed on the cloth tape 4. The periphery of the inner sheet $d$ and the cloth portion 4 are then secured to the lining sheet $b$ by heat sealing using high frequency current or any other known procedure.

Figure 10:
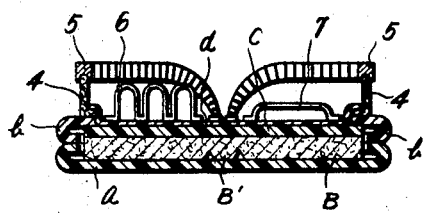
Figure 11:
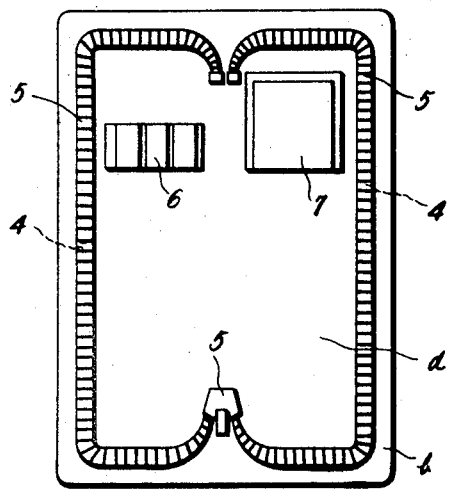
FIG. 11 is a plan view illustrating a case for small articles formed by the method steps shown in FIGS. 1 through 10.

The resultant case is illustrated in section in FIG. 10 and in plan in FIG. 11, and it will be noted that the interior thereof may be provided with attachments such as pencil receptacle rings 6 and pockets 7. The case may be folded on itself about the center line defined by the score portion B', and the separable slide fastener 5 may be closed.

Figure 12:
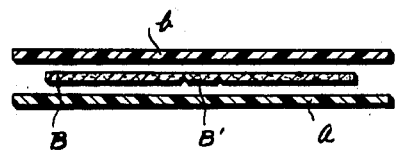
FIG. 12 is a transverse sectional view illustrating the starting step in another embodiment of the method of the invention.
Figure 13:
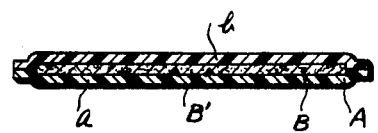
FIG. 13 is a transverse sectional view illustrating a succeeding step in this alternative method.

FIGS. 12 through 18 illustrate an alternative method of the invention. Referring to FIGS. 12 and 13, a bag body A is formed by enclosing a pad board B between an exterior sheet $a$ and a lining sheet $b$, both of soft, flexible, heat sealable synthetic resin. Pad board B may be made of a rigid synthetic resin sheet or of a thick paper sheet, so as to be folded in half along a score portion B'. Exterior sheet $a$ and lining sheet $b$ are slightly larger than pad board B, and are superposed on the front and rear surfaces of pad board B, as shown in FIG. 12. The exterior sheet and the lining sheet are then sealed to each other by heat sealing around their periphery, using high frequency current or any other known procedure, to form the bag body A enclosing the pad board B.

Figure 14:
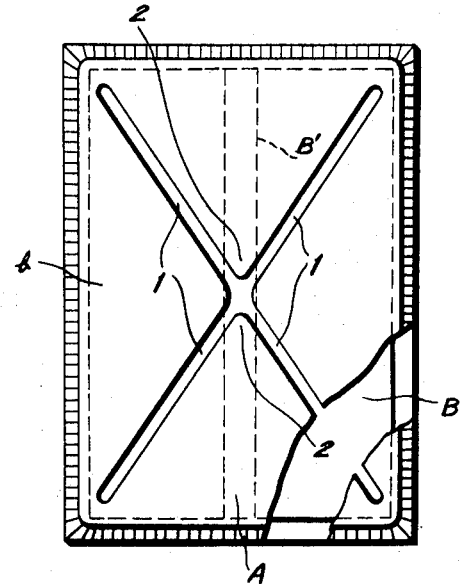
FIG. 14 is a plan view, partly broken away, illustrating a succeeding step in the alternative method of the invention.
Figure 15:
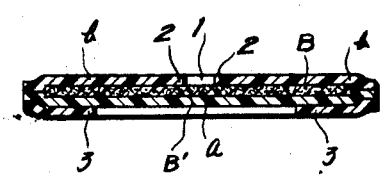
FIGS. 15 and 16 are sectional views illustrating application of an edge tape in the alternative method of the invention.
Figure 16:
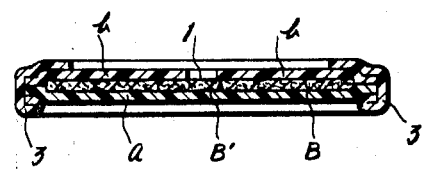
Figure 17:
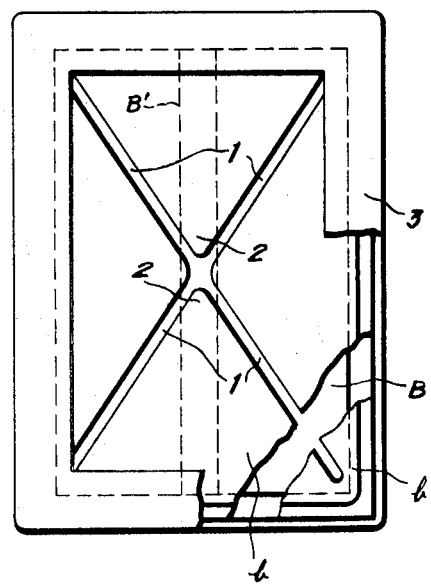
FIG. 17 is a plan view, partly broken away, corresponding to the sectional view shown in FIG. 16.

Lining sheet $b$ is provided or formed with intersecting diagonal cuts or slits 1 leaving four triangular shaped tabs 2, as best seen in FIG. 14. Referring to FIG. 15, an edge tape 3, of soft, flexible, heat sealable, synthetic resin is superposed on the outer surface of exterior sheet $a$ and has its periphery welded to the joined peripheries of sheet $a$ and sheet $b$ by heat sealing, by the application of high frequency current or by any other known procedure. Tape 3 is then folded back upon itself over the lining sheet $b$ of bag body A, without the tabs 2 being severed, as shown in FIGS. 16 and 17.

Figure 18:
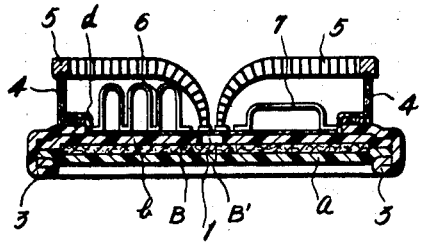
FIG. 18 is a sectional view illustrating a final step in the alternative method.
Figure 19:
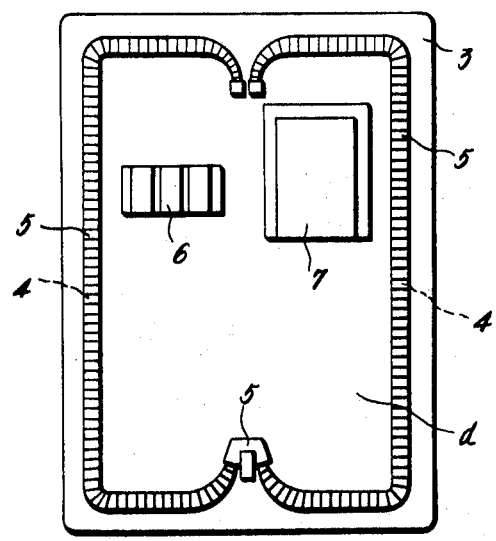
FIG. 19 is a plan view corresponding to the sectional view shown in FIG. 18.

Referring to FIG. 18, a cloth tape 4 of a separable slide fastener 5 is superposed on the folded over portion of edge tape 3 and thereafter an inner lining sheet $d$ of soft, flexible, heat sealable synthetic resin has its periphery superposed over the cloth tape 4. The folded edge of tape 3, cloth tape 4 and the periphery of inner liner sheet $d$ are united by heat sealing by high frequency or the like to obtain the final product as shown in FIG. 19.

Inner lining sheet $d$ may be previously provided with attachments or devices such as pencil receptacle rings 6 and pockets 7. If tape 3 is superposed on the outer surface of exterior sheet $a$ when the exterior and lining sheets are superposed over pad board B, and the edges of both sheets are united by heat sealing to enclose the pad board B with a bag body A, the structure shown in FIG. 19 is obtained.

The present invention thus provides a product which is excellent not only in appearance but also from the standpoint of commercial value. As the lining sheet is applied to the pad while the triangular tabs of the lining sheet, which forms the bag body in cooperation with the exterior sheet, are pulled, there is no risk of development of any creases or folds in the exterior sheet during the manufacturing process. Consequently, both the exterior and lining sheets are applied smoothly to the pad, resulting in a finished product which is beautifully smooth in appearance.

Additionally, the pad B which is secured by the sealed edges of the exterior and lining sheets within the turned bag body, in the first embodiment, or by the sealed edges in cooperation with the edge tape 3 in the second embodiment of the invention, is thus maintained in place. Consequently, there is no danger that the pad will slip out of place during usage and, in consequence, any wear or tear of the exterior sheet due to friction between the pad and the exterior sheet is prevented. As the sealed edges of the exterior lining sheets are maintained inside the bag body, or covered by the edge tape, the sealed edges provide a smooth surface that is not only durable but also safe. Stated in another way, there is no wear and tear of the sealed edges because the edges do not have any friction with any other portion of the bag, and consequently the user cannot have his hand or finger injured while handling the bag.

An advantageous feature of the invention is that no binding agent or cement is used, thereby preventing the bag in process from being stained by a binding agent or cement. Consequently, a product which is stain-free, of uniform quality, and attractive in appearance may be efficiently manufactured.

While specific embodiments of the invention have been shown and described in detail to illustrate the application of the principles of the invention, it will be understood that the invention may be embodied otherwise without departing from such principles.

What is claimed is:

1. A method of manufacturing a case for small articles, said method comprising superposing an exterior sheet and a liner sheet of flexible, heat sealable synthetic resin; heat sealing the peripheral margins of the superposed sheets to form a substantially flat bag; forming a pair of diagonally intersecting slits in said liner sheet to provide for substantially triangular flaps; turning said bag inside out, whereby said peripheral edges of the sealed sheets project inwardly within the bag; providing a relatively stiff pad board having a scored portion extending substantially centrally of one surface; pulling said triangular flaps outwardly under tension and inserting said pad board into said bag to engage said inwardly projecting peripheral edges of the heat sealed sheets; severing said flaps to form a substantially rectangular opening, having a margin extending around the liner sheet; superposing tape means of a separable slide fastener means on such latter margin; and heat sealing the tape means to such latter margin.

2. A method of manufacturing a case for small articles, as claimed in claim 1, in which said liner sheet is formed with said diagonally intersecting slits before being superposed on said exterior sheet and heat sealed to the latter.

3. A method of manufacturing a case for small articles, as claimed in claim 1, including the step of heat sealing a further sheet of flexible, heat sealable synthetic resin to the opposite surface of said pad board.

4. A method of manufacturing a case for small articles, as claimed in claim 1, including the step of, in advance of heat sealing the tape means to such latter margin, superposing the marginal area of a lining, of flexible, heat sealable synthetic resin, on such tape means; and then heat sealing the marginal area of said lining, said tape means and said latter margin.

References Cited

UNITED STATES PATENTS

| | | | |
|---|---|---|---|
| 2,581,763 | 1/1952 | Hickler | 156—66X |
| 2,666,466 | 1/1954 | Sharat | 156—66X |
| 2,674,559 | 4/1954 | Zobel | 156—66 |
| 2,711,779 | 6/1955 | Carland | 156—290X |

LELAND A. SEBASTIAN, Primary Examiner

S. HELLMAN, Assistant Examiner